(12) United States Patent
Szolyga et al.

(10) Patent No.: US 7,319,485 B2
(45) Date of Patent: Jan. 15, 2008

(54) APPARATUS AND METHOD FOR RECORDING DATA IN A CIRCULAR FASHION

(75) Inventors: Thomas Szolyga, Saratoga, CA (US); William Hastings Gray, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 10/394,351

(22) Filed: Mar. 21, 2003

(65) Prior Publication Data

US 2004/0183912 A1 Sep. 23, 2004

(51) Int. Cl.
*H04N 5/76* (2006.01)

(52) U.S. Cl. .............................. 348/231.2; 348/231.6; 386/101; 386/110

(58) Field of Classification Search ............. 348/211.2, 348/211.11, 231.99, 231.2, 231.6, 231.9, 348/207.1; 386/101, 110
See application file for complete search history.

(56) References Cited

U.S. PATENT DOCUMENTS

| | | | |
|---|---|---|---|
| 6,167,186 A * | 12/2000 | Kawasaki et al. | 386/46 |
| 6,476,858 B1 | 11/2002 | Ramirez Diaz et al. | |
| 6,614,408 B1 * | 9/2003 | Mann | 345/8 |
| 6,950,600 B2 * | 9/2005 | Dietz | 386/46 |
| 2002/0191952 A1 * | 12/2002 | Fiore et al. | 386/46 |

* cited by examiner

*Primary Examiner*—Lin Ye
*Assistant Examiner*—Chriss S Yoder, III

(57) ABSTRACT

The present invention includes a method and apparatus for recording data. According to the present invention, the method and apparatus includes the implementation of a "circular" buffer whereby data is capable of being recorded in a circular fashion. By implementing a circular buffer, large amounts of data can be recorded over long periods of time without the use of cumbersome video tapes and the like. An aspect of the present invention includes an apparatus for recording data. The apparatus includes an input sensor for receiving data, a buffer coupled to the input sensor wherein the buffer includes a plurality of storage portions, a central processing unit coupled to the buffer and the input sensor wherein the central processing unit stores the data in the plurality of storage portions in a circular fashion and an interface coupled to the buffer for allowing a remote data accessing device to access a specific portion of the data stored in the buffer.

20 Claims, 16 Drawing Sheets

200

Bridge Interfaces

Modem - PSTN
Network-LAN
Network-WAN
Modem- Satellite
Cell Phone-PTSN

Keyboard
Pointer Device
Printer
Modem
Scanner
Microphone

Figure 11

Utilizing a remote data accessing device to access a circular buffer of a video camera.
1210

Retreiving data from the circular buffer of the video camera.
1320

Storing the retreived data in a memory component of the remote data accessing device.
1230

Figure 12

APPARATUS AND METHOD FOR RECORDING DATA IN A CIRCULAR FASHION

FIELD OF THE INVENTION

The present invention relates to systems for recording data, and more particularly to an apparatus and method for recording data.

BACKGROUND OF THE INVENTION

Data capturing systems such as video security systems utilize video cameras to generate video signals representative of locations for which security surveillance is desired. In a typical system, some or all of the video signals are displayed on video screens for monitoring by security personnel. Some or all of the video signals are recorded on videotape, either to provide evidentiary support for the observations of security personnel or in cases where "real-time" human monitoring of the signals is impractical or is not desired.

However, videotape suffers from serious drawbacks as a storage medium, particularly in view of the large quantity of video information generated by video security systems. A major concern is the sheer quantity of tapes to be stored, especially when it is desired to record signals generated by a large number of surveillance cameras. Moreover, in a large system many videotape recorders may be required, resulting in a large capital expenditure, and also the need to allocate space for the recorders. Another problem is the need to frequently change tape cassettes.

Retrieving information of interest from recorded tapes presents additional challenges. It is the nature of video surveillance that a large part of the tape-recorded video surveillance signal is of no interest whatsoever, since it typically represents a static image of a hall-way or the like. Finding a particular sequence representing a significant event can be extremely difficult and time-consuming, requiring tedious human review of hours or days of tape-recorded signals.

There have been a number of attempts to overcome these disadvantages, but so far with limited success, or at the cost of additional drawbacks. For example, it is known to use "quad multiplexers" to combine signals from four video cameras into a single dynamic image, having four quadrants each dedicated to a respective one of the cameras. The resultant space-multiplexed signal can then be recorded, realizing a four-to-one compression ratio in terms of required storage medium. However, the multiplexed image suffers from a corresponding loss of spatial resolution, which may impair the value of the recorded images as evidence or may interfere with subsequent review. Also, the recording of multiplexed images does not address the problems involved in finding sequences of interest on the recorded tapes.

It is also known to record the surveillance video signals selectively in response to input from a human operator who is monitoring the signals or in response to signals generated by sensor devices arranged to detect events such as opening of doors or windows. This technique reduces the total information to be recorded, while preventing storage of much uninteresting information, but at the risk of failing to record significant events which cannot readily or timely be detected by sensors or human operators. Also, reliance on external input can result in unreliability and increased expense, particularly where human operators are to initiate recording.

Accordingly, what is needed is an apparatus that eliminates video cassette tapes and the related short comings thereof. The apparatus should be simple, cost effective and capable of being easily adapted to existing technology. The present invention addresses these needs.

SUMMARY OF THE INVENTION

The present invention includes an apparatus and method for recording data. According to the present invention, the method and apparatus includes the implementation of a "circular" buffer whereby data is capable of being recorded in a circular fashion. By implementing a circular buffer, large amounts of data can be recorded over long periods of time without the use of cumbersome video tapes and the like. Additionally, through the use of the method and apparatus in accordance with the present invention, a user can employ a remote data accessing device to select particularly useful data from the large amount of stored data and analyze it accordingly.

A first aspect of the present invention includes an apparatus for recording data. The apparatus includes an input sensor for receiving data, a buffer coupled to the input sensor wherein the buffer includes a plurality of storage portions, a central processing unit coupled to the buffer and the input sensor wherein the central processing unit stores the data in the plurality of storage portions in a circular fashion and an interface coupled to the buffer for allowing a remote data accessing device to access a specific portion of the data stored in the buffer.

A second aspect of the present invention includes a method for recording data. The method includes receiving data from an input source, storing the data in a circular fashion in a buffer wherein the buffer includes a plurality storage portions and providing an interface for allowing a remote data accessing device to access a specific portion of the data stored in the buffer.

A third aspect of the present invention includes a system for managing data. The system includes a recording apparatus wherein the recording apparatus includes an input sensor for receiving data, a buffer coupled to the input sensor wherein the buffer includes a plurality of storage portions, a central processing unit coupled to the buffer and the input sensor wherein the central processing unit stores the data in the plurality of storage portions in a circular fashion and an interface coupled to the buffer for allowing access to a specific portion of the data stored in the buffer. The system further includes a remote data accessing device for accessing the specific portion of the data stored in the buffer via the interface.

A fourth aspect of the present invention includes a video surveillance camera. The video surveillance camera includes an optical sensor for receiving data, a buffer coupled to the optical sensor wherein the buffer includes a plurality of storage portions wherein the plurality of storage portions further comprise a first storage portion configured to store data at a first rate, a second storage portion configured to store data at a second rate and a third storage portion configured to store data at a third rate, a central processing unit coupled to the buffer and the input sensor wherein the central processing unit stores the data in the plurality of storage portions in a circular fashion and an interface coupled to the buffer for providing access to a specific portion of the data in the buffer by a remote data accessing device.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 10 shows a non-exhaustive list of bridge interfaces which may be included in a remote data accessing device in accordance with an alternate embodiment of the present invention.

FIG. 11 shows a non-exhaustive list of I/O devices which may be included in the remote data accessing device in accordance with an alternate embodiment of the present invention.

FIG. 12 shows a flowchart of a method in accordance with an alternate embodiment of the present invention.

DETAILED DESCRIPTION

The present invention relates to an apparatus and method for recording data. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention includes an apparatus and method for recording data. According to the present invention, the method and apparatus includes the implementation of a "circular" buffer whereby data is capable of being recorded in a circular fashion. By implementing a circular buffer, large amounts of streaming data can be recorded over long periods of time without the use of cumbersome video tapes and the like. Additionally, through the use of the method and apparatus in accordance with the present invention, a user can employ a remote accessing device to select particularly useful data from the large amount of stored data and save it accordingly.

Figure 1:
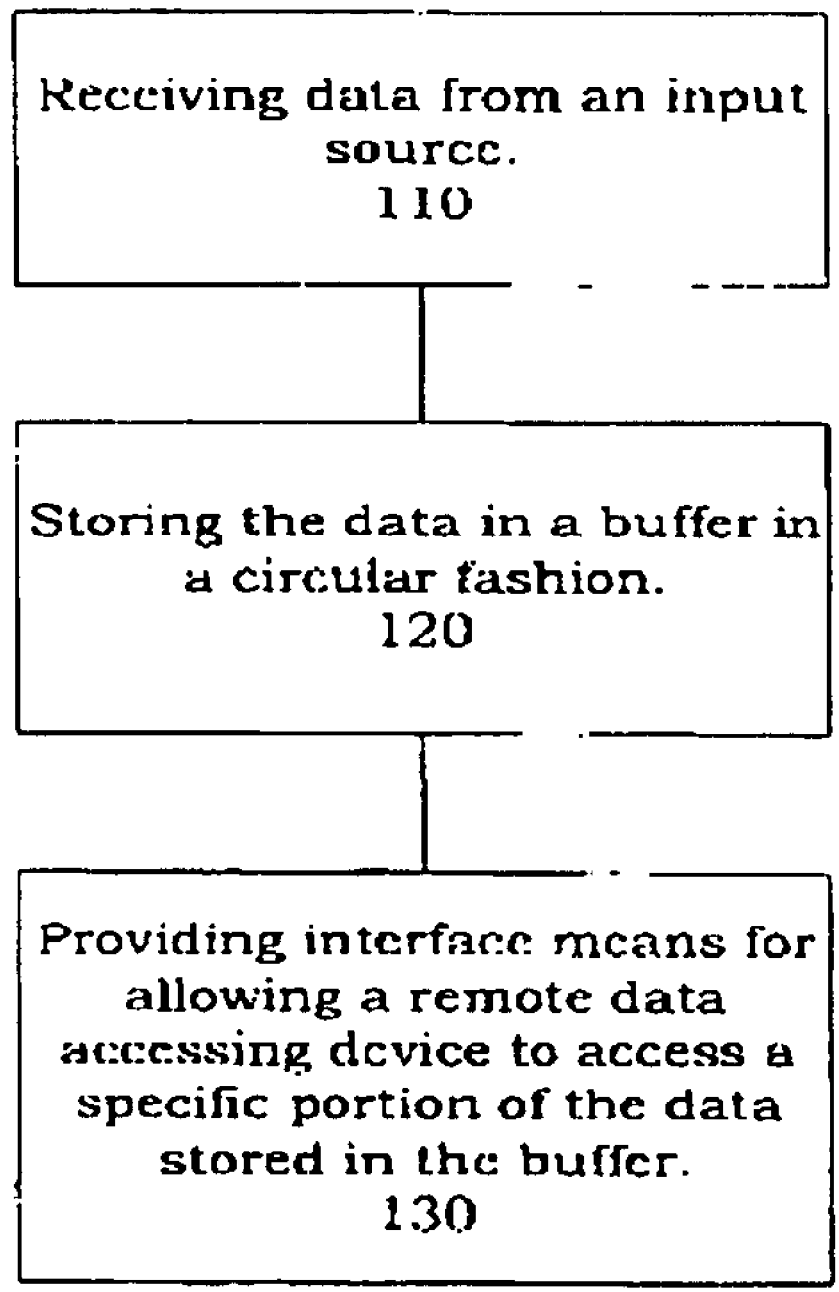
FIG. 1 is a high-level flow chart of a method in accordance with an embodiment of the present invention.

FIG. 1 is a flowchart of a method in accordance with an embodiment of the present invention. A first step 110 includes receiving data from an input source. A second step 120 includes storing the data in a buffer in a circular fashion. A final step 130 includes providing an interface for allowing a remote data accessing device to access a specific portion of the data stored in the buffer.

Figure 2:
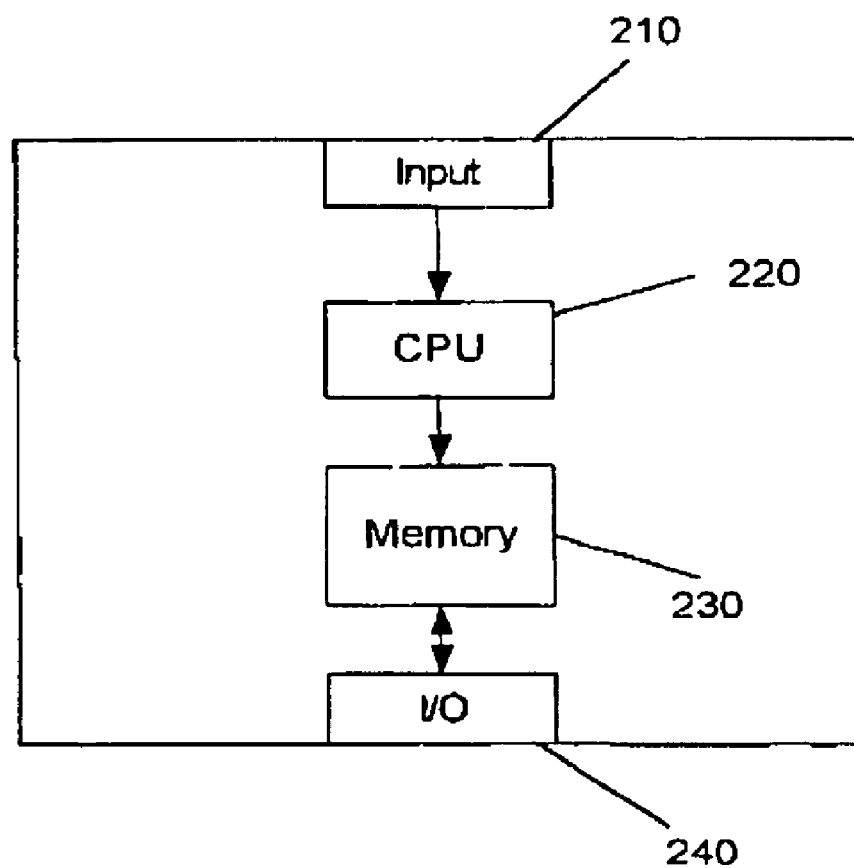
FIG. 2 is a block diagram of a recording apparatus in accordance with an embodiment of the present invention.

FIG. 2 is a block diagram of a recording apparatus 200 in accordance with an embodiment of the present invention. As shown in FIG. 2, the apparatus 200 includes an input portion 210 for receiving data, a central processing unit (CPU) 220, a memory portion 230 and an input/output (I/O) interface 240. The input portion 210 and the memory portion 230 are coupled to the CPU 220 and the I/O interface 240 is coupled to the memory portion 230.

The input portion 210 transmits data to the CPU 220 for processing. The data could include video, audio or any of a variety of types of data. The CPU 220 receives the transmitted data and transmits the data to the memory portion 230. In an embodiment, the memory portion 230 is a solid state component. A solid state component is an electronic component or circuit made of solid materials, such as transistors and chips. There is no mechanical action in a solid state component, although an unbelievable amount of electromagnetic action takes place within it. In an embodiment, the memory portion 230 is a circular buffer. For the purposes of this patent application, the term "circular" is defined as capable of storing data in a circular fashion. Storing data in a "circular fashion" can be construed to mean storing data in the buffer from the beginning of the buffer until the buffer reaches full capacity. Subsequently, once the buffer reaches full storage capacity, the storing of data starts over at the beginning of the buffer.

Figure 3:
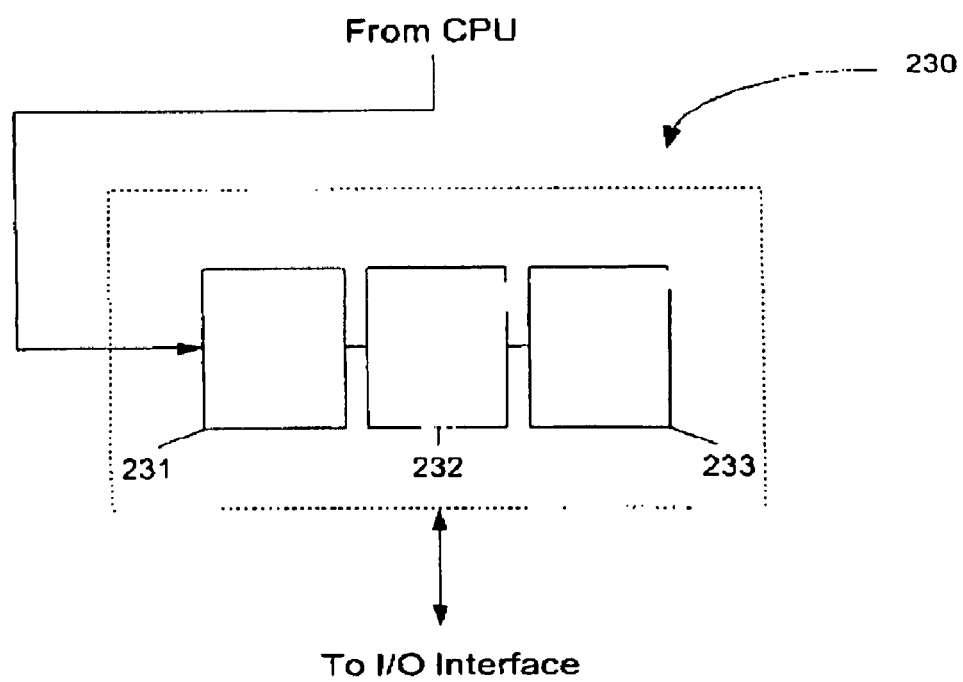
FIG. 3 shows a more detailed illustration of a circular buffer in accordance with an embodiment of the present invention.

FIG. 3 shows a more detailed illustration of the circular buffer 230 in accordance with an embodiment of the present invention. The circular buffer 230 includes a first storage portion 231, a second storage portion 232 and a third storage portion 233. In accordance with an embodiment of the present invention, once data begins to be received by the circular buffer 230, data is stored in the first storing portion 231 first. Once the first storage portion 231 reaches a predetermined threshold (e.g. full storage capacity), data is moved from the first storage portion 231 to the second storage portion 232. Because the data contents of the first storage portion 231 are no longer at the predetermined threshold, incoming data can continue to be stored in the first storage portion 231. In the same fashion, once the second storage portion 232 reaches a predetermined threshold, data is moved from the second storage portion 232 to the third storage portion 233.

Although the above disclosed embodiment of the present invention is described as being utilized in conjunction with a circular buffer that includes three storage portions, one of ordinary skill in the art will readily recognize that any number of storage portions could by employed in conjunction with the above disclosed embodiment of the present invention while remaining within the spirit and scope of the present invention.

Figure 4:
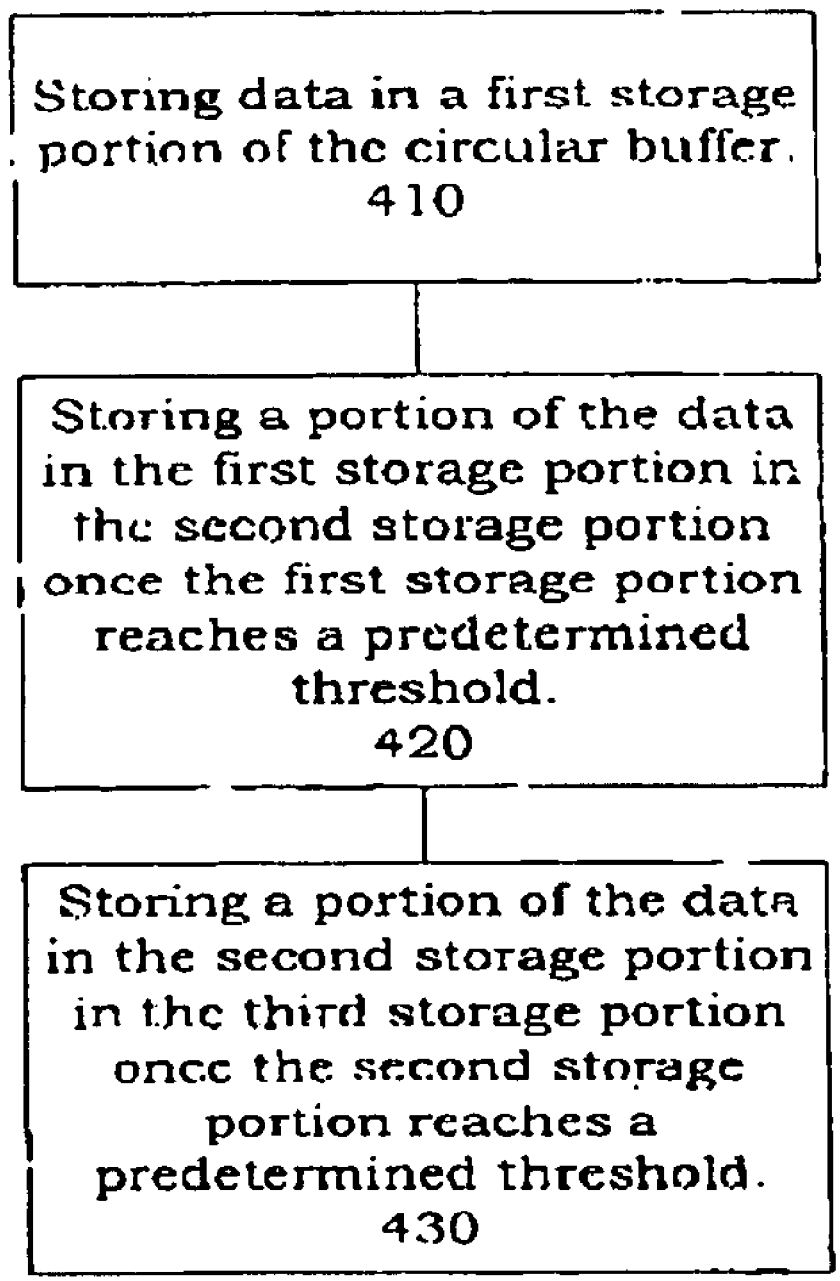
FIG. 4 is a flow chart of the operation of the circular buffer in conjunction with a method in accordance with an embodiment of the present invention.

FIG. 4 is a flow chart of the operation of the circular buffer 230 in conjunction with a method in accordance with an embodiment of the present invention. A first step 410 involves storing data in a first storage portion of the circular buffer. A second step 420 involves storing a portion of data from the first storage portion into the second storage portion once the first storage portion reaches a predetermined threshold. A final step 430 involves storing a portion of data from the second storage portion into the third storage portion once the second storage portion reaches a predetermined threshold.

Figure 5:
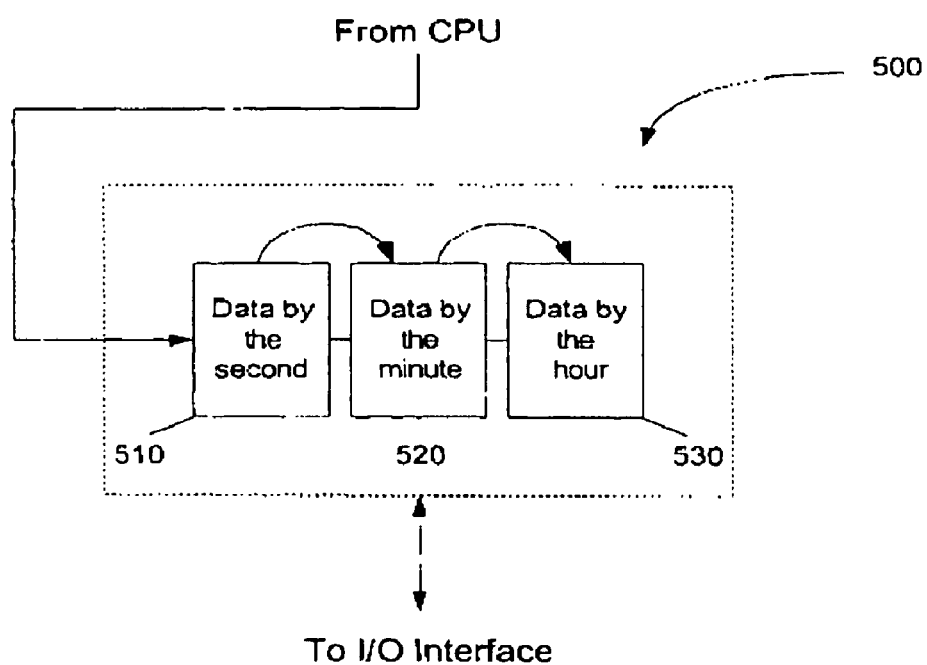
FIG. 5 shows an example of a circular buffer in accordance with another embodiment of the present invention.

In an embodiment, the first storage portion is configured to store data captured at a first rate, the second storage portion is configured to store data captured at a second rate and the third storage portion is configured to store data captured at a third rate. For example, the first storage portion could be configured to record data at a rate of 1 image per second, the second storage portion could be configured to record data at a rate of 1 image per minute and the third storage portion could be configured to record data at a rate of 1 image per hour. FIG. 5 shows an example of a circular buffer 500 in accordance with another embodiment of the present invention. As can be seen, the circular buffer 500 includes a first storage portion 510 configured to store data by the second, a second storage portion 520 configured to store data by the minute, and a third storage portion 530 configured to store data by the hour.

Accordingly, once the CPU (not shown) begins to receive data (e.g. video images), the received images are stored in the first storing portion 510 every second. Once the first storage portion 510 reaches storage capacity, every $60^{th}$ image of data is moved from the first storage portion 510 to the second storage portion 520. Since every $60^{th}$ image of data in the first storage portion 310 constitutes a received image per minute (i.e. $60^{th}$ image equals the image at 1 minute, $120^{th}$ image equals the image at 2 minutes, $180^{th}$ image equals the image at 3 minutes, etc.), the contents of the second storage portion 520 are images received by the circular buffer 500 per minute.

Similarly, once the second storage portion 520 reaches storage capacity, every $60^{th}$ image of data in the second storage portion 520 is moved from the second storage portion 510 to the third storage portion 530. Since every $60^{th}$ image of data in the second storage portion 310 constitutes a received image per hour (i.e. $60^{th}$ image in the second storage portion 520 equals image at 1 hour, $120^{th}$ image in the second storage portion 520 equals image at 2 hours, etc.), the contents of the third storage portion 530 are images received by the circular buffer 500 per hour.

Figure 6:
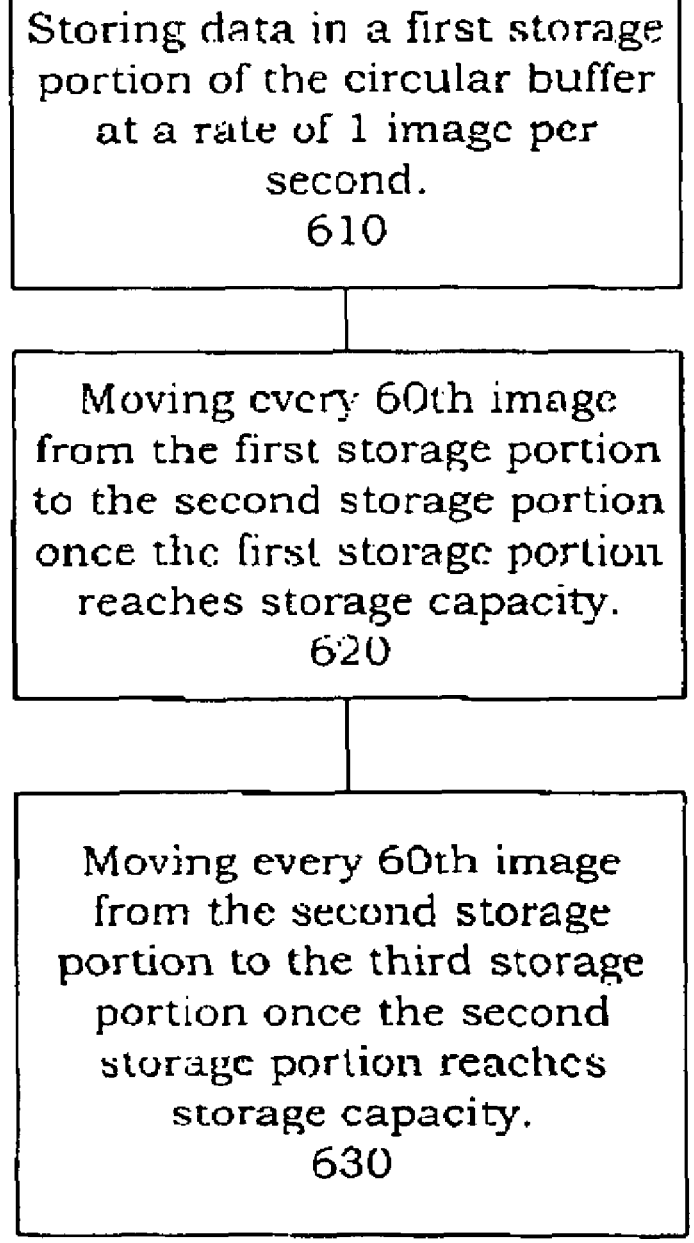
FIG. 6 is a flow chart of the operation of the circular buffer in conjunction with a method in accordance with another embodiment of the present invention.

FIG. 6 is a flow chart of the operation of the circular buffer 500 in conjunction with a method in accordance with another embodiment of the present invention. A first step 610 involves storing data in a first storage portion of the circular buffer at a rate of 1 image per second. A second step 620 involves moving every $60^{th}$ image from the first storage portion to the second storage portion once the first portion reaches storage capacity. A final step 630 involves moving every $60^{th}$ image from the second storage portion to the third storage portion once the second portion reaches storage capacity.

Although the above disclosed embodiment of the present invention is described as being utilized in conjunction with storage portions configured to respectively store data by the second, minute and hour, one of ordinary skill in the art will readily recognize that different configurations could be utilized in conjunction with this embodiment of the present invention while remaining within the spirit and scope of the present invention. For example, additional storage portions could be included in the circular buffer to store data by the day, by the week, etc.

Figure 7:
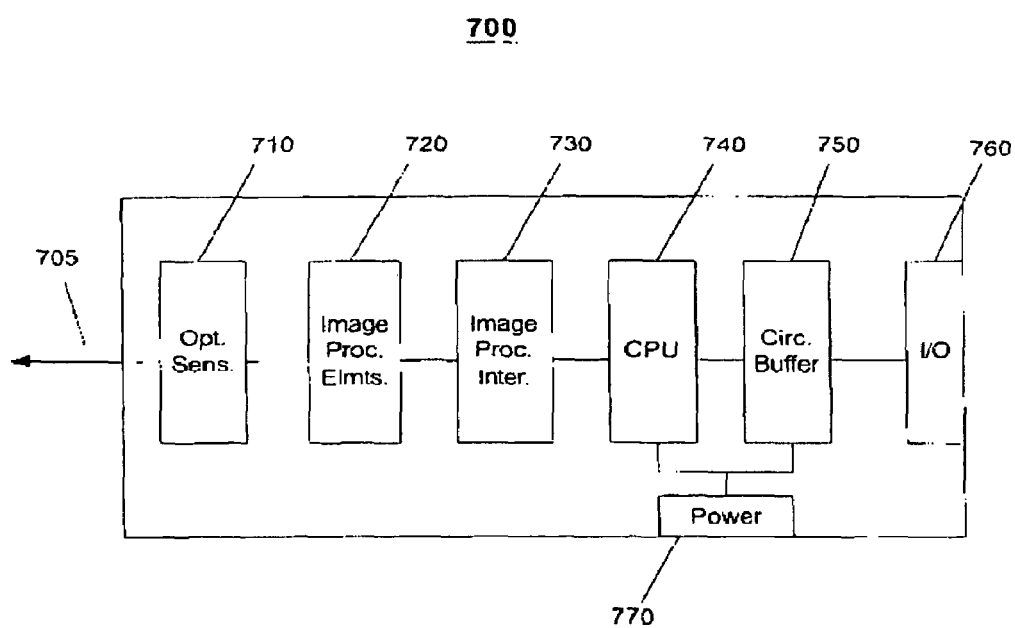
FIG. 7 is a block diagram of a video surveillance camera system in accordance with an embodiment of the present invention.

In an embodiment, the recording apparatus is a video surveillance camera system. FIG. 7 is a block diagram of a video surveillance camera system 700 in accordance with an embodiment of the present invention. The video surveillance camera system 700 includes an optical sensor 710, image processing elements 720, an image processing interface 730, a CPU 740, a circular buffer 750 and an I/O interface 760. The image processing elements 720 are coupled to the optical sensor 710 and the image processing interface 730. The CPU 740 is coupled to the image processing interface 730 and the circular buffer 750 wherein the circular buffer includes first, second and third storage portions (not shown). The circular buffer 750 is further coupled to the I/O interface 760.

Additionally, a power source 770 is coupled to the CPU 740 and the circular buffer 750. In an embodiment, the power source 770 is a solar power source. Accordingly, the video surveillance camera system 700 could be operated without having to change batteries and without the added complexity of electrical cords or wires.

In operation, the optical sensor 710 captures real-time images of objects via reflected light along optical path 705. The raw image data can then be routed through the image processing elements 720 and the image processing interface 730. Interface 730 has an output to the CPU 740 whereby the processed images are passed to the circular buffer 750. The CPU 740 subsequently stores data in the first, second and third portions of the circular buffer 750 in a circular fashion.

The I/O interface 760 can be utilized to access the processed images in the circular 750. In an embodiment, the video camera 700 includes access means (not shown) such as an on-board keypad or the like coupled to the I/O interface 760 for accessing data stored in the circular buffer 750. However, in an alternate embodiment, a remote device could be coupled to the camera 700 via the I/O interface 760 whereby data can be accessed from the circular buffer 750 by the remote data accessing device and saved into a permanent storage component of the remote data accessing device.

Figure 8:
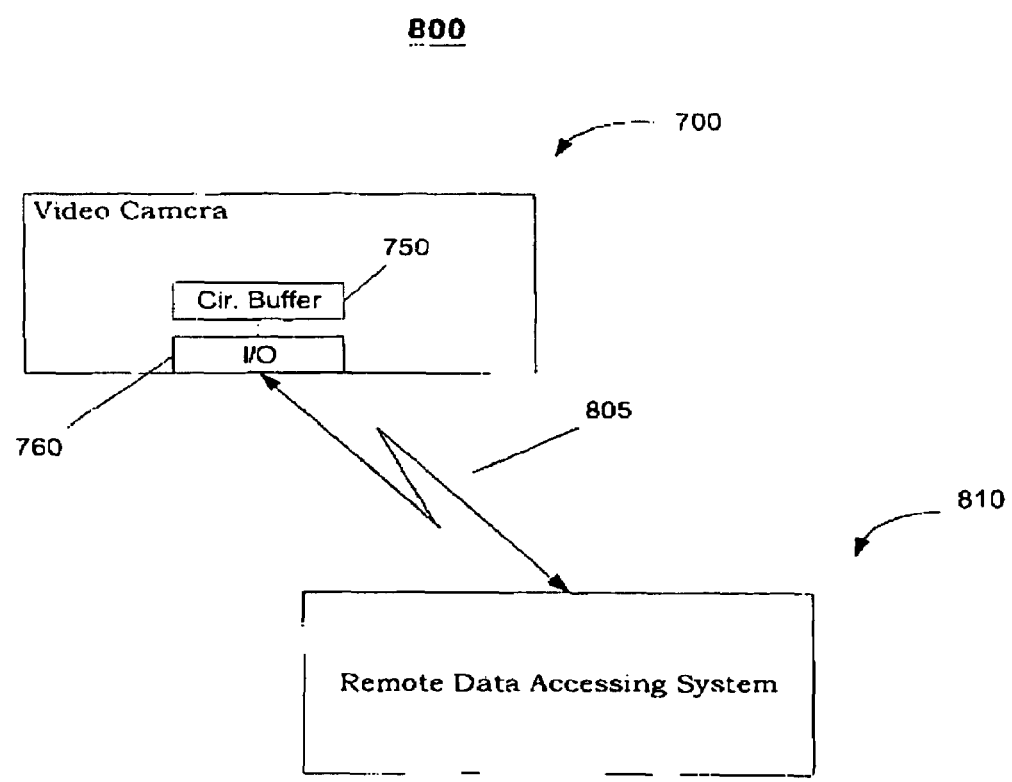
FIG. 8 shows an example of a system in accordance with an alternate embodiment of the present invention.

Accordingly, FIG. 8 shows an example of a system 800 in accordance with an alternate embodiment of the present invention. The system includes the video camera 700 of FIG. 7 and a remote data accessing device 810. The remote data accessing device 810 is coupled to the I/O interface 760 via a cable or wireless link 805 whereby the remote data accessing 810 accesses selected data from the circular buffer 750. Consequently, especially valuable data, for instance video of a terrorist attack, can be accessed by the remote data accessing device 810, based on date and time stamps of the stored images, and stored in a permanent memory component of the remote data accessing device 810 for further analysis. Additionally, since longer periods of time can be recorded with the camera 700, less obvious events from a day, a week or a month earlier from the incident in question can be accessed by the remote data accessing device 810 as well.

Figure 9:
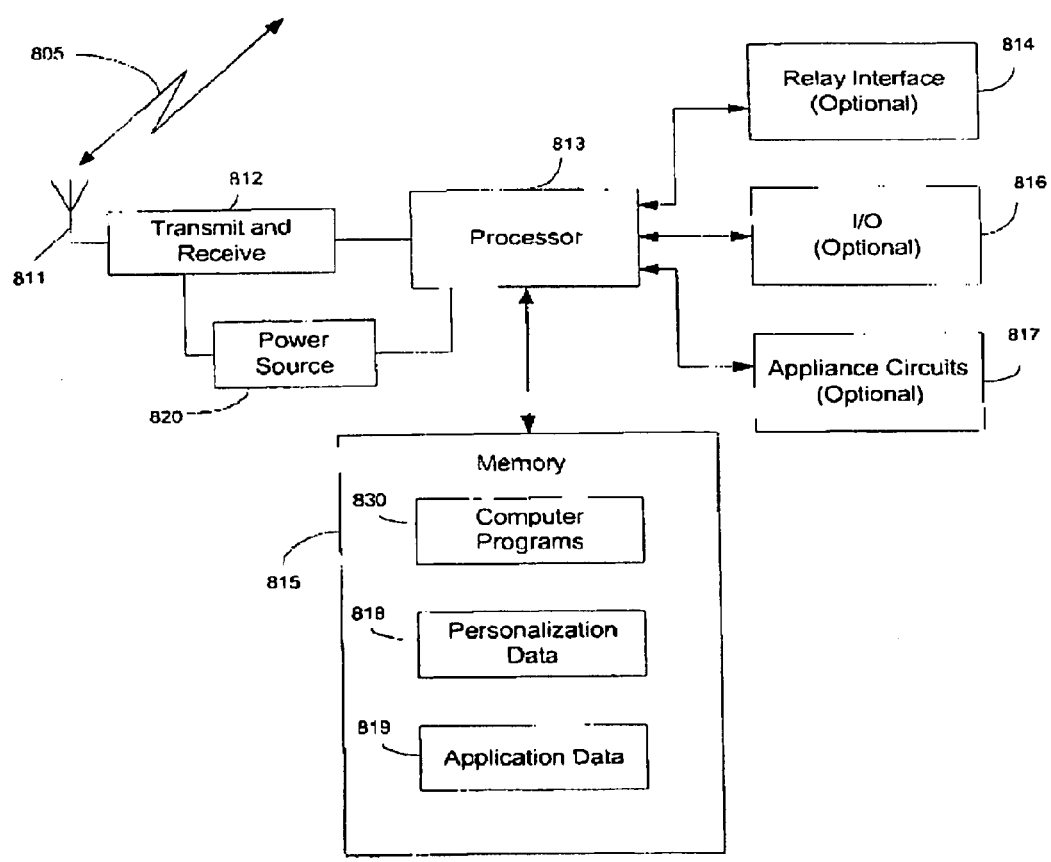
FIG. 9 shows a block diagram of hardware that could be included in a remote data accessing device that could be utilized in conjunction with an alternate embodiment of the present invention.

One of ordinary skill in the art will readily recognize that the remote accessing device 810 could comprise a variety of mobile devices (PDA, laptop computer, mobile phone, etc.) while remaining within the spirit and scope of the present invention. Accordingly, FIG. 9 shows a block diagram of hardware that could be included in a remote data accessing device 810 that could be utilized in conjunction with an alternate embodiment of the present invention. The remote data accessing device 810 includes an antenna 811 configured to support wireless communication link 805. Antenna 811 couples to a transmit and receive section 812. Transmit and receive section 812 is compatible with the protocols that the remote data accessing device 810 uses to communicate with the video camera 700. An adjustable power source 820 couples to transmit and receive section 812 and to a processor 813. Processor 813 couples to a memory 814, an optional bridge interface 815, an optional I/O section 816, and optional appliance circuits 817.

Processor 813 executes computer programs 830 which are stored in memory 814. A processor is one of the Intel family of microprocessors including the 386, 486 or Pentium microprocessors. However, other microprocessors including, but not limited to, Motorola's family of microprocessors such as the Intel Pentium 4, Centrino, and IntelXscale microprocessors and various Reduced Instruction Set Computer (RISC) microprocessors such as the PowerPC chip manufactured by IBM. Other RISC chips made by Hewlett Packard, Sun, Motorola and others may also be used.

Computer programs 830 define processes performed by processor 813. Processor 813 is capable of adjusting the power being supplied by the power source 820 to the transmit and receive section 812. Additionally, memory 814 can store personalization data 818 and application data 819. Personalization data 818 characterize a user or owner of the remote data accessing device 810 and may change from user to user. ID codes, passwords, and PINs are examples of personalization data 818 as are radio or TV channel presets, language preferences, and speed dial telephone numbers. Application data 819 is provided by performing peer applications, and may change from moment to moment.

FIG. 10 shows a non-exhaustive list of bridge interfaces 815 which may be included in the remote data accessing device 810. Referring to FIGS. 9 and 10, bridge interfaces 815 may be configured as any of a wide variety of relay, routing, or gateway devices known to those skilled in the art. For example, the bridge interfaces 815 may couple the remote data accessing device 810 to LANs or WANs. For example, web browser can be utilized to access the Internet. A web browser is a program that serves as a front end to the World Wide Web on the Internet. In order to view a web page, the web page address (URI) is typed into the browser's Location field.

FIG. 11 shows a non-exhaustive list of I/O devices 816 which may be included in the remote data accessing device 810. Referring to FIGS. 9 and 11, I/O devices 816 may be classified into input devices and output devices. Input devices may include keyboards, pointing devices, optical scanners, microphones, and other well-known input devices. Output devices may include printers, monitors, speakers, and other well-known output devices.

Those skilled in the art will readily appreciate that bridge interface section 815, I/O section 816 and appliance circuits 817 are not mutually exclusive categories. For example, many devices fall into multiple categories. For example, a computer considered as an appliance may include both an I/O section and a bridge interface. Likewise, a bridge interface may serve an I/O role.

The communication link 805 could be a cable link or a wireless link that comports with a wireless transmission protocol. An example of a wireless transmission protocol is the IEEE 802.11 or WiFi protocol. The 802.11 protocol is a family of IEEE standards for wireless LANs first introduced in 1997. The first standard was 802.11b, which specifies from 1 to 11 Mbps in the unlicensed 2.4 GHz band using direct sequence spread spectrum (DSSS) technology. Using the orthogonal FDM (OFDM) transmission method, there are two subsequent standards that provide from 6 to 54 Mbps: 802.11 a transmits in the higher 5 GHz frequency range and is not backward compatible with the slower 802.11b; 802.11g works in the same range and is compatible.

An 802.11 system works in two modes. In "infrastructure mode," wireless devices communicate to a wired LAN via access points. Each access point and its wireless devices are known as a Basic Service Set (BSS). An Extended Service Set (ESS) is two or more BSSs in the same subnet. In "ad hoc mode," also known as "peer-to-peer mode," wireless devices can communicate with each other directly and do not use an access point. This is an Independent BSS (IBSS). The speed of 802.11 systems is distance dependent. The farther away the remote device from the base station, the lower the speed.

Additionally, in accordance with an embodiment of the present invention, the communication link 805 is a radio link in accordance with the Bluetooth Global Specification for wireless connectivity. Bluetooth is an open standard for short-range transmission of digital voice and data between mobile devices (laptops, PDAs, phones) and desktop devices. It supports point-to-point and multipoint applications. Unlike Infra-Red, which requires that devices be aimed at each other (line of sight), Bluetooth uses omni-directional radio waves that can transmit through walls and other non-metal barriers. Bluetooth transmits in the unlicensed 2.4 GHz band and uses a frequency hopping spread spectrum technique that changes its signal 1600 times per second. If there is interference from other devices, the transmission does not stop, but its speed is downgraded.

The Bluetooth baseband protocol is a combination of circuit and packet switching. Each data packet is transmitted in a different hop frequency wherein the maximum frequency hopping rate is 1600 hops/s. Bluetooth can support an asynchronous data channel, up to three simultaneous synchronous voice channels, or a channel which simultaneously supports asynchronous data and synchronous voice. Each voice channel supports 64 kb/s synchronous (voice) link. The asynchronous channel can support a symmetric link of maximally 721 kb/s in either direction while permitting 57.6 kb/s in the return direction, or a 432.6 kb/s symmetric, link.

FIG. 12 shows a flowchart of a method in accordance with the above-described alternate embodiment of the present invention. A first step 1210 includes utilizing a remote accessing device to access a circular buffer of a video camera. A next step 1220 includes retrieving data from the circular buffer of a video camera. A final step 1230 includes storing the retrieved data in a memory component of the remote accessing device.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol (TCP/IP), which was specifically designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways refer to devices that translate between applications. For example, e-mail gateways translate messages from one vendor's messaging program to another vendor's messaging program so that users with different e-mail programs can share messages over a network.

Typically, the computers connected to a wide area network such as the Internet are identified as either servers or clients. A server is a computer that stores files that are available to the other computers connected to the network. For example, an e-mail server manages message traffic and mail boxes for users, in addition to translation facilities or gateways that allow message exchange between different types of e-mail programs. A client is a computer connected to the network that accesses shared resources provided by a server. To obtain information from a server, a client makes a request for a file or information located on the server using a specified protocol. Upon reception of a properly formatted request, the server downloads the file or information to a local message store located at the client.

Figure 13:
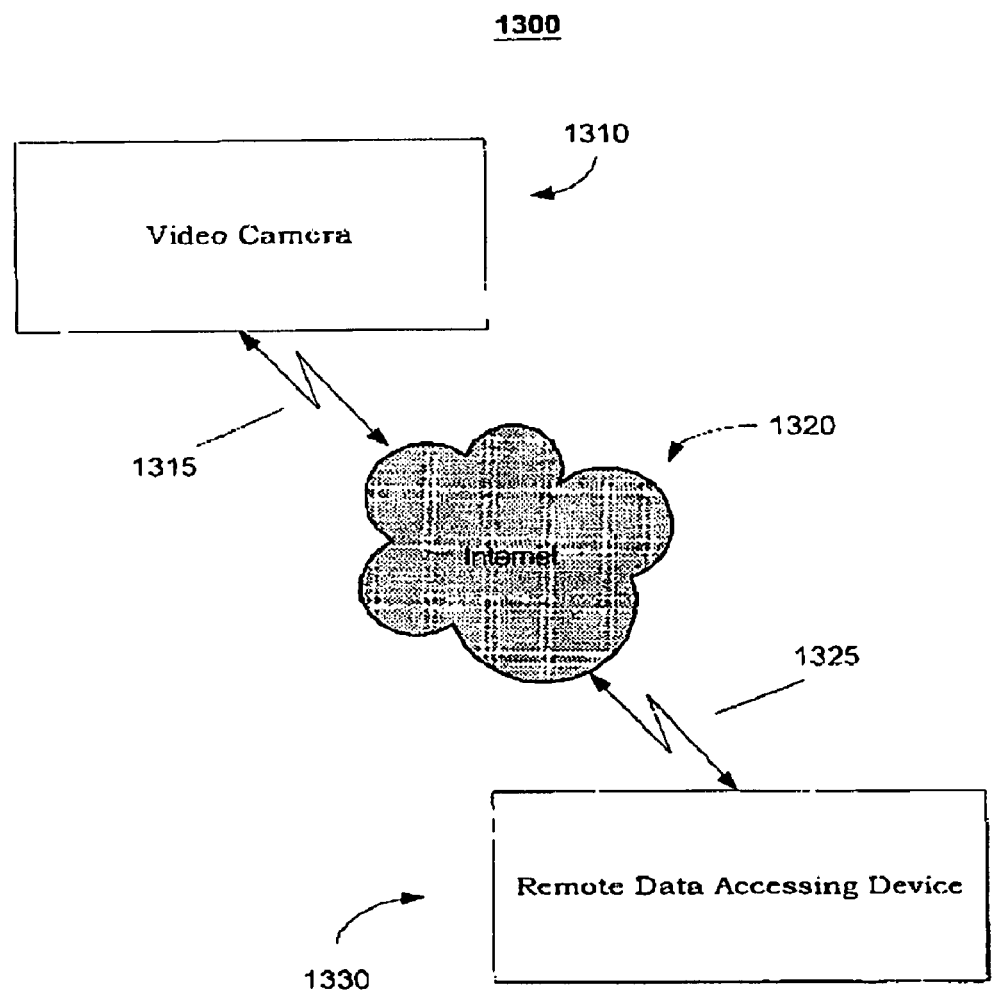
FIG. 13 shows a system in accordance with another embodiment of the present invention.

FIG. 13 shows a system 1300 in accordance with another embodiment of the present invention. The system 1300 includes a video camera 1310 (similar to the video camera 700), a network 1320 (e.g. the Internet) and a remote data accessing device 1330. The video camera 1310 is coupled to the network 1320 via communication link 1315 and the remote data accessing device 1330 is coupled to the network 1320 via communication link 1325. In an embodiment, the remote data accessing device 1330 accesses the video camera 1310 via the network 1320 through communication links 1315 and 1325 respectively. Accordingly, data can be retrieved from the circular buffer of the video camera 1310 and stored in a permanent memory component of the remote data accessing device 1330.

Figure 14:
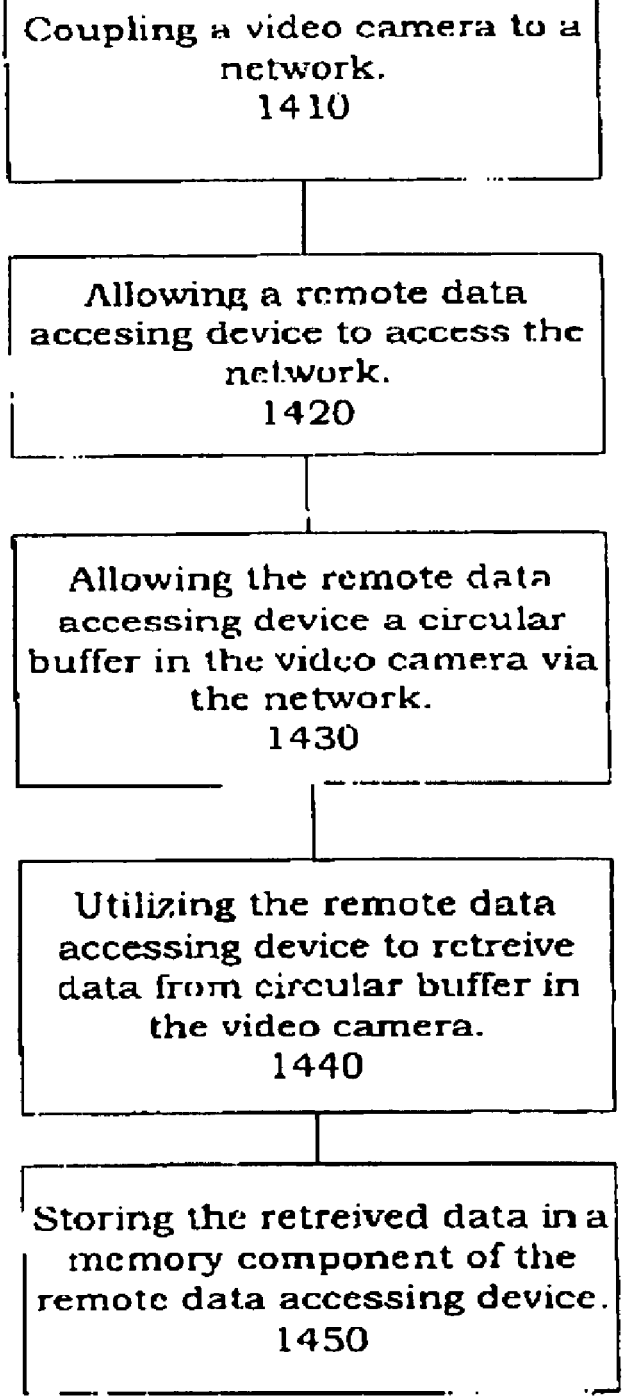
FIG. 14 shows a flowchart of the operation of a system in accordance with another embodiment of the present invention.

FIG. 14 shows a flowchart of the operation of the above-described embodiment of the present invention. A first step 1410 includes coupling a video camera to a network. In an embodiment, the network includes the Internet. A second step 1420 includes allowing a remote data accessing device to access the network. A next step 1430 involves allowing the remote data accessing device to access a circular buffer in the video camera. A next step 1440 includes utilizing the remote data accessing device to retrieve data from the circular buffer. A final step 1450 includes storing the retrieved data in a permanent memory component of the remote data accessing device.

Another embodiment of the present invention involves a system that includes more than one video camera (e.g. multiple video cameras at different locations in a bank). Accordingly, a remote data accessing device can be utilized to simultaneously extract data from the same time frame from each of the video cameras. Image analysis techniques can then be utilized by the remote data accessing device on the data extracted from the multiple video cameras to create an enhanced image of the data in question.

Figure 15:
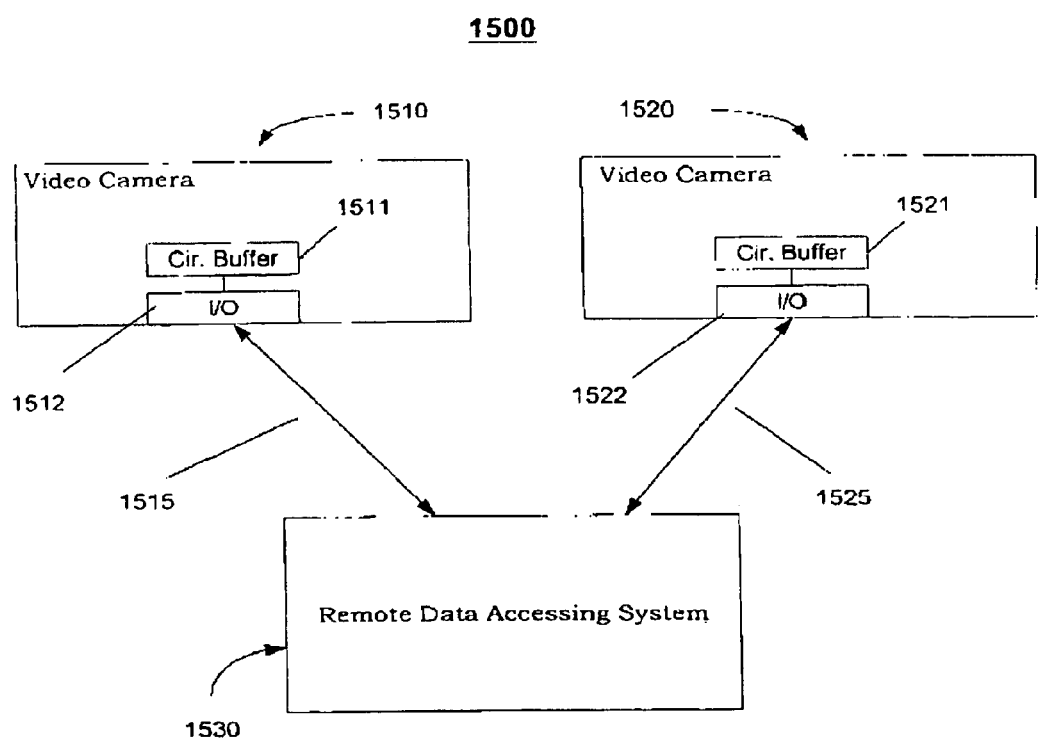
FIG. 15 shows a system in accordance with an alternate embodiment of the present invention

FIG. 15 shows a system 1500 in accordance with the above-described alternate embodiment of the present invention. The system 1500 includes a video camera 1510 and a second video camera 1520. In an embodiment, the first and second video cameras 1510, 1520 are placed at different physical locations to capture different aspects of the area to be recorded. The first and second data video cameras 1510, 1520 respectively include circular buffers 1511, 1521 wherein the circular buffers 1511, 1521 are respectively coupled to I/O interfaces 1512, 1522.

Accordingly, a remote data accessing device 1530 can simultaneously access the circular buffers 1511, 1512 of the first and second data video cameras 1510, 1520 via communication links 1515, 1525 and I/O interfaces 1512, 1522 to extract data from the circular buffers 1511, 1512. In an embodiment, the remote data accessing device includes image analysis software modules 1535 for implementing image analysis techniques on the extracted data. In an embodiment, the remote data accessing device 1530 is a hand-held device (e.g. PDA, laptop computer, etc.) and communication links 1515, 1525 are wireless (e.g. Bluetooth) links.

By way of example, suppose the first and second data video cameras 1510, 1520 were placed in different locations of the lobby of a bank that was recently robbed at a specific time on a specific date e.g. 2:30 PM on May 15. The remote data accessing device 1530 can be utilized to simultaneously retrieve high resolution images from the circular buffers 1511, 1512 of the first and second data video cameras 1510, 1520 for the specific time that the bank was robbed. Additionally, since longer periods of time can be recorded by each of the first and second data video cameras 1510, 1520 based on the respective implementation of the circular buffers 1511, 1512, high resolution images of less obvious events that took place on May 14 or the week prior to May 15 can be accessed by the remote data accessing device 1530 as well.

Although the above-described embodiment is discussed in the context of being implemented with two data capturing systems, one of ordinary skill in the art will readily recognize that any number of data capturing systems could be utilized while remaining within the spirit and scope of the present invention.

Figure 16:
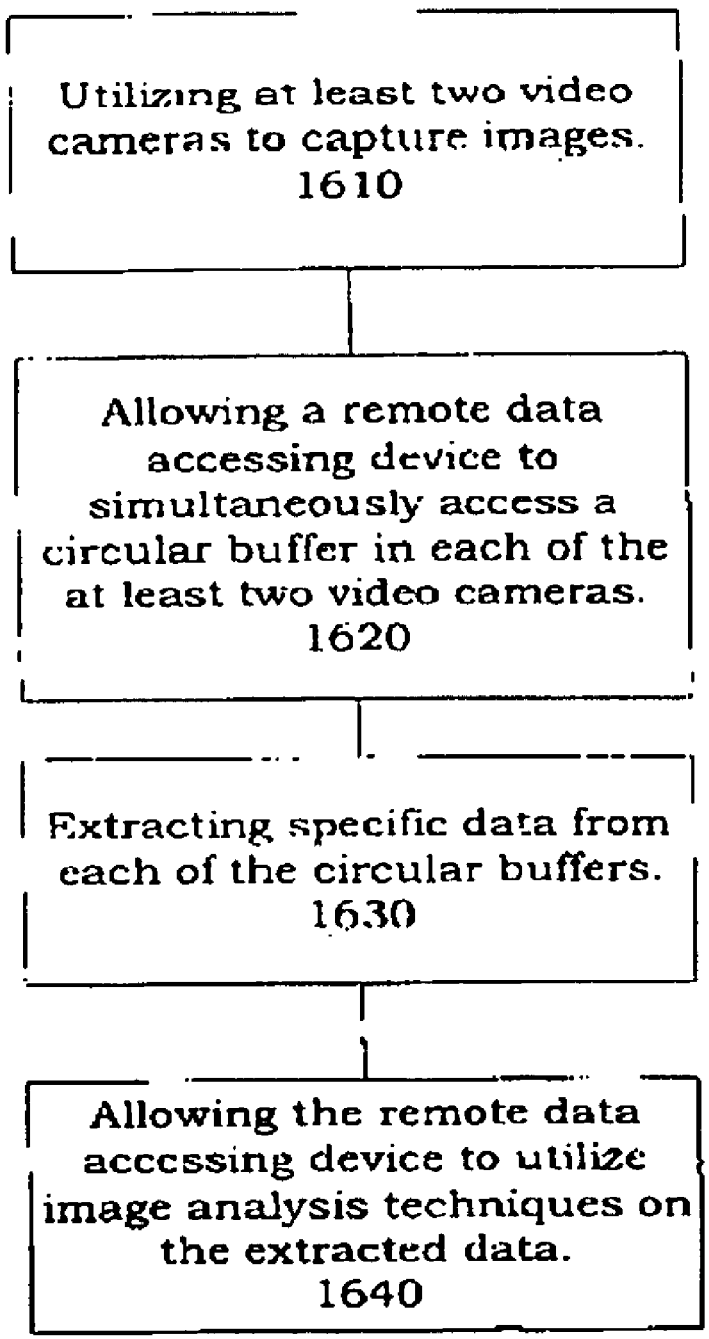
FIG. 16 is a flowchart of the operation of the system in accordance with the alternate embodiment of the present invention.

FIG. 16 shows a flowchart of the operation of the above-described embodiment of the present invention. A first step 1610 involves utilizing at least two video cameras to capture images. In an embodiment, each video camera includes a circular buffer. A second step 1620 involves allowing a remote data accessing device to simultaneous access each circular buffer. A next step 1630 involves extracting data from each respective circular buffer. A final step 1640 includes allowing the remote data accessing device to utilize image analysis techniques on the extracted data.

The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Figure 17:
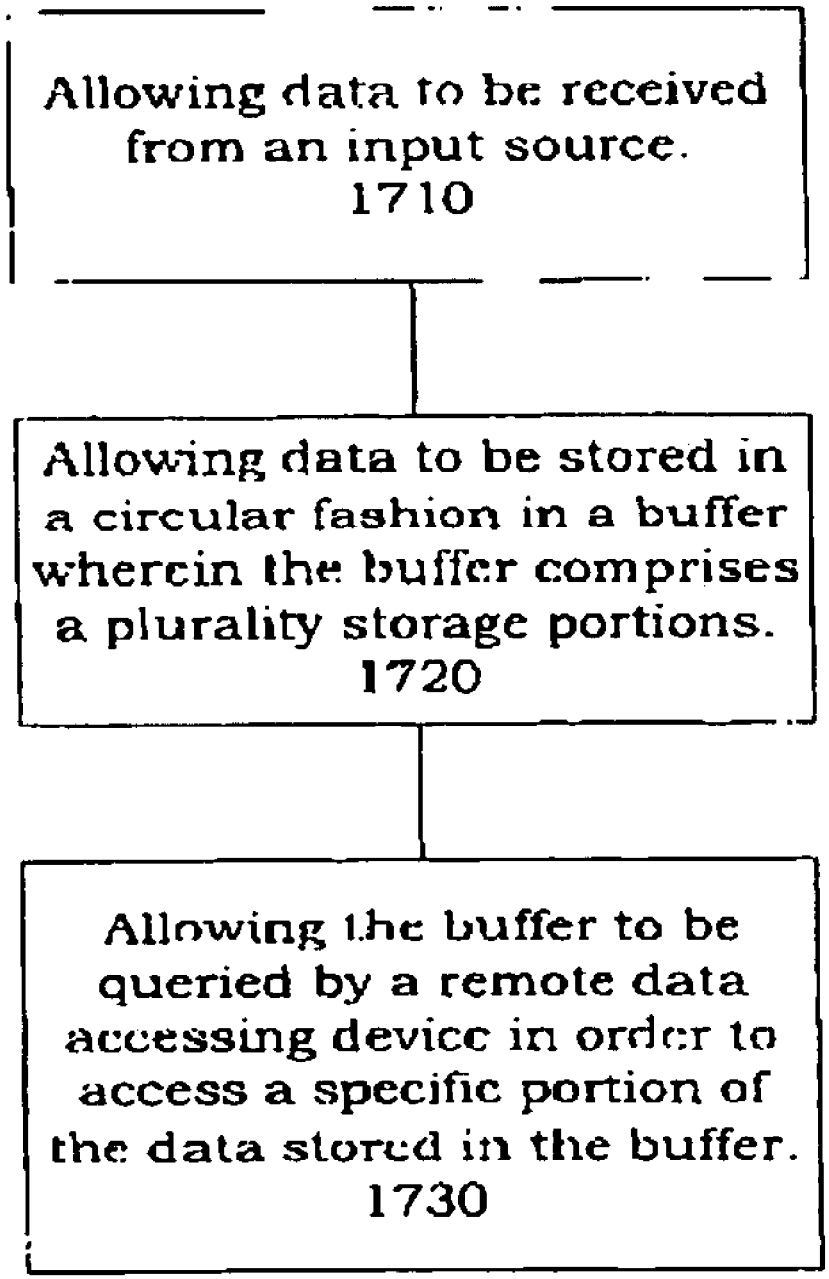
FIG. 17 is a flowchart of program instructions that could be contained within a computer readable medium in accordance with an alternate embodiment of the present invention.

FIG. 17 is a flowchart of program instructions that could be contained within a computer readable medium in accordance with the alternate embodiment of the present invention. A first step 1710 involves allowing data to be received from an input source. A second step 1720 involves allowing data to be stored in a circular fashion in a buffer wherein the buffer includes a plurality storage portions. A final step 1730 involves allowing the buffer to be queried by a remote data accessing device in order to access a specific portion of the data stored in the buffer.

An apparatus and method for recording data is disclosed. According to the present invention, the method and apparatus includes the implementation of a "circular" buffer whereby data is capable of being recorded in a circular fashion. By implementing a circular buffer, large amounts of streaming data can be recorded over long periods of time without the use of cumbersome video tapes and the like. Additionally, through the use of the method and apparatus in accordance with the present invention, a user can employ a remote data accessing device to select particularly useful data from the large amount of stored data and save it accordingly.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for recording data comprising:
   an input sensor for receiving data;
   a buffer coupled to the input sensor wherein the buffer comprises a plurality of storage portions structured and arranged to cyclically cascade from one to another, the plurality of storage portions including at least a first storage portion configured to store data at a first rate, a second storage portion configured to store data at a second rate and a third storage portion configured to store data at a third rate;
   a central processing unit coupled to the buffer and the input sensor wherein the central processing unit stores the data in the plurality of storage portions in a circular fashion including storing data from the first storage portion into the second storage portion once the first storage portion reaches a first predetermined threshold; and storing data from the second storage portion into the third storage portion once the second storage portion reaches a second predetermined threshold; and
   an interface coupled to the buffer for allowing a remote data accessing device to access a specific portion of the data stored in the buffer.

2. The apparatus of claim 1 wherein the input sensor comprises an optical sensor.

3. The apparatus of claim 1 wherein the input sensor comprises an audio input sensor.

4. The apparatus of claim 1 wherein the interface is capable of transmitting and receiving a wireless radio frequency link.

5. The apparatus of claim 4 wherein the wireless radio frequency link further comprises a Bluetooth link.

6. The apparatus of claim 1 wherein each of the plurality of storage portions is configured to store data at a different rate.

7. The method of claim 1 wherein the first rate comprises 1 image per second, the second rate comprises 1 image per minute and the third rate comprises 1 image per hour.

8. The apparatus of claim 1 further comprising a solar power source coupled to the central processing unit.

9. A method of recording data comprising:
   receiving data from an input source, storing the data in a circular fashion in a buffer wherein the buffer comprises a plurality of storage portions structured and arranged to cyclically cascade from one to another, the plurality of storage portions including at least a first storage portion configured to store data at a first rate, a second storage portion configured to store data at a second rate and a third storage portion configured to store data at a third rate;
   storing data from the first storage portion into the second storage portion once the first storage portion reaches a first predetermined threshold; and storing data from the second storage portion into the third storage portion once the second storage portion reaches a second predetermined treshold; and
   providing an interface for allowing a remote data accessing device to access a specific portion of the data stored in the buffer.

10. The video surveillance camera of claim 9 wherein the first rate comprises 1 image per second, the second rate comprises 1 image per minute and the third rate comprises 1 image per hour.

11. A system for managing data comprising:
    an optical sensor for receiving data;
    a buffer coupled to the input sensor wherein the buffer comprises a plurality of storage portions structured and arranged to cyclically cascade from one to another wherein the plurality of storage portions further comprise at a first storage portion configured to store data at a first rate, a second storage portion configured to store data at a second rate and a third storage portion configured to store data at a third rate;
    a central processing unit coupled to the buffer and the input sensor wherein the central processing unit stores the data in the plurality of storage portions in a circular fashion including storing data from the first storage portion into the second storage portion once the first storage portion reaches a first predetermined threshold; and storing data from the second storage portion into the third storage portion once the second storage portion reaches a second predetermined threshold; and an interface coupled to the buffer for allowing access to a specific portion of the data stored in the buffer by a remote data accesing device.

12. The video surveillance camera of claim 11 wherein the first rate comprises 1 image per second, the second rate comprises 1 image per minute and the third rate comprises 1 image per hour.

13. The video surveillance camera of claim 11 wherein the interface is capable of transmitting data from the buffer via a wireless radio frequency link.

14. The video surveillance camera of claim 11 wherein the interface is capable of transmitting data from the buffer to a network.

15. A system for managing data comprising:
a recording apparatus wherein the recording apparatus comprises: an input sensor for receiving data;
a buffer coupled to the input sensor wherein the buffer comprises a plurality of storage portions structured and arranged to cyclically cascade from one to another wherein the plurality of storage portions further comprise at least a first storage portion configured to store data at a first rate, a second storage portion configured to store data at a second rate and a third storage portion configured to store data at a third rate;
a central processing unit coupled to the buffer and the input sensor wherein the central processing unit stores the data in the plurality of storage portions in a circular fashion including storing data from the first storage portion into the second storage portion once the first storage portion reaches a first predetermined threshold; and storing data from the second storage portion into the third storage portion once the second storage portion reaches a second predetermined threshold; and
an interface coupled to the buffer for allowing access to a specific portion of the data stored in the buffer; and a remote data accessing device for accessing the specific portion of the data stored in the buffer via the interface.

16. The system of claim 15 wherein the interface is capable of transmitting data from the buffer to the remote accessing device via a wireless radio frequency link.

17. The system of claim 16 wherein the remote data accessing device comprises a personal digital assistant.

18. The system of claim 16 wherein the remote data accessing device comprises a computer system.

19. The system of claim 16 further comprising another recording apparatus coupled to the recording apparatus wherein the remote data accessing device is capable of simultaneously accessing the recording apparatus and another recording apparatus.

20. A computer readable medium containing program instructions for recording data, the program instructions comprising the steps of:
allowing data to be received from an input source;
allowing data to be stored in a circular fashion in a buffer wherein the buffer comprises a plurality of storage portions structured and arranged to cyclically cascade from one to another wherein the plurality of storage portions further comprise at least a first storage portion configured to store data at a first rate, a second storage portion configured to store data at a second rate and a third storage portion configured to store data at a third rate, the storing of data including storing data from the first storage portion into the second storage portion once the first storage portion reaches a first predetermined threshold; and storing data from the second storage portion into the third storage portion once the second storage portion reaches a second predetermined threshold; and
allowing the buffer to be queried by a remote data accessing device in order to access a specific portion of the data stored in the buffer.

* * * * *

UNITED STATES PATENT AND TRADEMARK OFFICE
CERTIFICATE OF CORRECTION

PATENT NO. : 7,319,485 B2
APPLICATION NO. : 10/394351
DATED : January 15, 2008
INVENTOR(S) : Thomas Szolyga et al.

Page 1 of 1

It is certified that error appears in the above-identified patent and that said Letters Patent is hereby corrected as shown below:

Drawings:
On sheet 11 of 16, in Fig. 12, Box 2, line 4, delete "1320" and insert -- 1220 --, therefor.

In column 12, line 21, in Claim 7, delete "method" and insert -- apparatus --, therefor.

In column 12, line 27, in Claim 9, after "source" delete "," and insert -- ; --, therefor.

In column 12, line 41, in Claim 9, delete "treshold" and insert -- threshold --, therefor.

In column 12, line 45, in Claim 10, delete "video surveillance camera" and insert -- method --, therefor.

In column 12, line 49, in Claim 11, delete "system for managing data" and insert -- video surveillance camera --, therefor.

In column 12, line 51, in Claim 11, after "to the" insert -- video --.

In column 12, line 55, in Claim 11, delete "at" before "a first".

In column 13, line 1, in Claim 11, delete "allowing" and insert -- providing --, therefor.

In column 13, line 2, in Claim 11, after "data" delete "stored".

In column 13, line 3, in Claim 11, delete "accesing" and insert -- accessing --, therefor.

Signed and Sealed this

Twenty-fourth Day of June, 2008

JON W. DUDAS
*Director of the United States Patent and Trademark Office*